(No Model.)
A. H. FLOWER.
SAW JOINTING MACHINE.
No. 484,494. Patented Oct. 18, 1892.
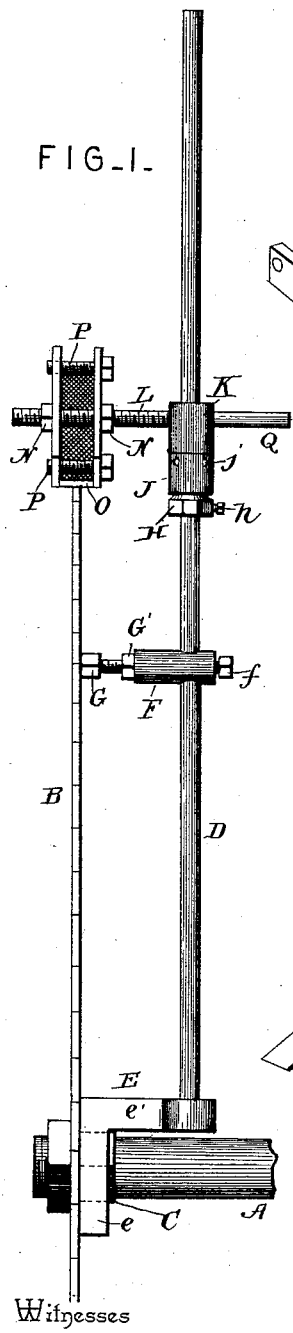
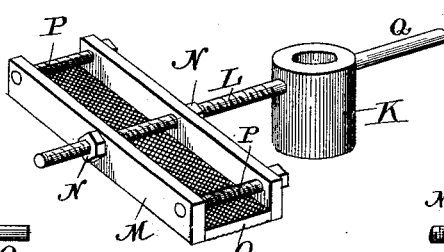
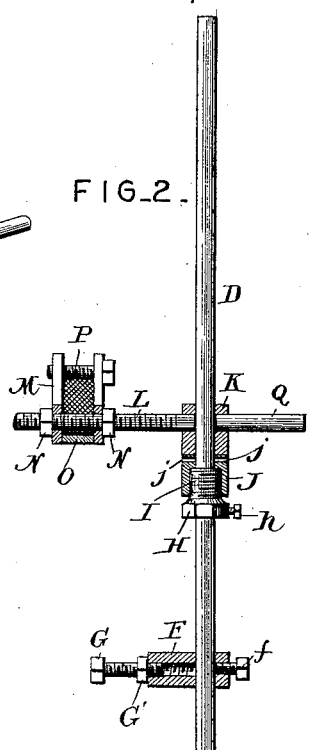
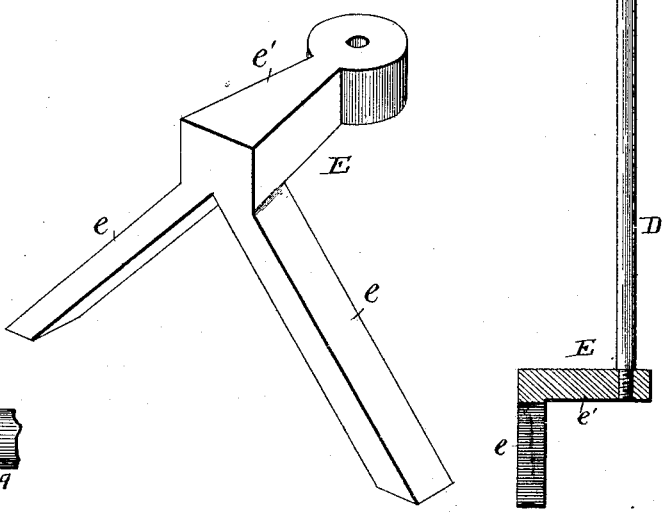
Witnesses
Jas. K. McCathran
D. P. Wolhaupter
Inventor
Albert H. Flower
By his Attorneys,
C. A. Snow & Co.

UNITED STATES PATENT OFFICE.

ALBERT H. FLOWER, OF TRANSFER, PENNSYLVANIA.

SAW-JOINTING MACHINE.

SPECIFICATION forming part of Letters Patent No. 484,494, dated October 18, 1892.

Application filed February 24, 1892. Serial No. 422,683. (No model.)

*To all whom it may concern:*

Be it known that I, ALBERT H. FLOWER, a citizen of the United States, residing at Transfer, in the county of Mercer and State of Pennsylvania, have invented a new and useful Saw-Jointing Machine, of which the following is a specification.

This invention relates to saw-filing machines; and it has for its object to provide a machine or device of this character which is particularly adapted for use in filing the teeth of circular saws to make said saws perfectly round and their teeth true, and is, therefore, a filing device for truing circular saws.

To this end it is the main object of this invention to improve the construction of such devices which shall permit an accurate adjustment of the same to all sizes of saws, and thus especially adapt it for its use in truing saws.

With these and many other objects in view, which will readily appear as the nature of the invention is better understood, the same consists in the novel construction, combination, and arrangement of parts hereinafter more fully described, illustrated, and claimed.

In the accompanying drawings, Figure 1 is a side elevation of my improved filing device supported upon a circular-saw shaft and in a position for operation. Fig. 2 is a vertical longitudinal sectional view of the device. Fig. 3 is a detail in perspective of the file-clamp. Fig. 4 is a similar view of the angular supporting-rest.

Referring to the accompanying drawings, A represents an ordinary saw-arbor, carrying the circular saw B and provided with the ordinary fixed collar C, adjacent to and alongside of the saw B, carried thereby. An upright rod D, supporting the various portions of the filing device, is secured at its lower end in the forked rest-support E. The said forked rest-support E is provided with the diverging arms *e*, forming an angular rest snugly fitting over the collar C upon the saw-arbor shaft referred to. Said rest E is also provided with an upper offstanding arm *e'*, the inner end of which, together with the forked arms, fit snugly against the saw, while the opposite arm supports the vertical rod D, which is thus held off from the saw, which is designed to be stationary during the operation of filing the teeth true.

Located at a suitable point above the forked support E, is a cylindrical gage-box F, vertically adjustable on said rod by means of the set-screw *f* and provided at the end opposite to that in which said set-screw works with the adjustable gage-screw G, which gage-screw is so adjusted as to touch the side of the saw, together with the forked and offstanding arms of the rest, and is held in such adjusted position by the nut G'. This keeps the machine plumb with the saw, so that the back of every tooth which is filed will be perfectly square and all alike.

At a suitable point above the adjustable gage stop-collar H is secured adjustably upon said rod by means of the set-screw *h*, and said stop-collar is provided with an exteriorly-threaded portion I, which receives the adjustable gage and stop sleeve J, provided with a threaded socket working over said threaded portion of the stop-collar and loosely fitting the upright rod D, so that the said sleeve may be adjusted vertically thereon. The said stop and gage sleeve is further provided with a series of perforations *j*, which are adapted for the reception of a suitable tool for adjusting the same.

Loosely working upon the upright D, directly over the adjustable sleeve J, is the clamp-carrying collar K. Secured in one side of the collar K is the outwardly-extending threaded shank L, which receives the opposite file-clamping plates M, fitted thereover and held tightly at any angle desired by means of the binding-nuts N, working over said screw-threaded shank against said clamping-plates, as will be readily seen. The said parallel clamping-plates are designed to clamp therebetween the saw-file O, clamped between said plates or jaws under the threaded shank L and tightly held therein by means of the clamping-bolts P, passing through the opposite ends of said opposite clamping jaws or plates above the file, and thus securely holding the same therebetween. An operating hand-grasp or handle Q is secured to and extends from the opposite side of the collar K and serves to provide means whereby the same may be readily handled.

As stated, when in position for filing the teeth of the circular saw true and making said saw perfectly round the device is placed upon the fixed shaft and adjusted in position upon the saw, as already described. By means of the stop-collar and the adjustable gage and stop sleeve working thereon the file-clamp is adjusted accurately, so that the file will just touch the shortest tooth. Then, with the saw standing still while filing, the operator takes every tooth and files the same down until the file-clamp rests upon the adjustable gage and stop sleeve, at which time the teeth must be necessarily of the same length and regular and the saw perfectly true.

A material advantage must be noted in this device, inasmuch as the file can be adjusted to suit any angle of teeth and clamped at such angle during the entire operation, so that the work may be regular, and also that the filing device rounds from the center out while the saw is standing still, thereby avoiding the danger of being cut by the saw.

In operating the device by grasping the hand-grasp and the file-clamp the file may be easily reciprocated to do the work, while the filer sits in the same position as in the ordinary sharpening or swaging of the saw.

It is thought that the construction, operation, and many advantages of the herein-described filing-machine are apparent without further description.

Having thus described my invention, what I claim, and desire to secure by Letters Patent, is—

1. In a filing-machine, the combination of a vertical rod supported alongside of the saw, a cylindrical interiorly-threaded gage-box vertically adjustable on said rod, a laterally-adjustable gage-screw adapted to be adjusted in one end of said box, an adjustable stop-collar mounted on said rod above said gage box and screw, and a radially-swinging file-clamp movably connected with the rod above said collar, substantially as set forth.

2. In a filing-machine, the combination of a vertical rod supported alongside of the saw, a cylindrical gage-box vertically adjustable on said rod, a laterally-adjustable gage-screw adapted to be adjusted in one end of said box, an adjustable exteriorly-threaded stop-collar clamped on said rod above said gage box and screw, a vertically-movable gage and stop sleeve adjustably engaging said threaded collar, and a swinging file-clamp movably connected with the rod above said sleeve, substantially as set forth.

3. In a filing-machine, the combination of a vertical rod supported alongside of the saw, an adjustable gage and stop-collar mounted on said rod, a movable collar loosely working over said rod above said gage and stop-collar, an outwardly-extending threaded shank connected to one side of said collar, opposite file-clamping plates fitted over said threaded shank, opposite binding-nuts working over said threaded shank against said opposite plates, and opposite clamping-bolts passing through the opposite ends of said clamping-plates to clamp the file therein, substantially as set forth.

4. In a filing-machine, the combination, with a saw-arbor having a fixed collar, of a supporting-rest having an angular fork taking over said collar alongside of the saw and an integral offstanding arm extending off from the saw, a vertical rod supported upon said offstanding arm, a vertically-adjustable gage and stop collar mounted on said rod, and a radially-swinging file-clamp movably connected with the rod above said collar, substantially as set forth.

In testimony that I claim the foregoing as my own I have hereto affixed my signature in the presence of two witnesses.

ALBERT H. FLOWER.

Witnesses:
LYMAN CARRIER,
H. F. MOYER.